United States Patent
Dieterich et al.

(10) Patent No.: US 12,359,719 B2
(45) Date of Patent: Jul. 15, 2025

(54) METHOD FOR HEATING A GEARBOX FOR A WORKING MACHINE

(71) Applicant: ZF Friedrichshafen AG, Friedrichshafen (DE)

(72) Inventors: Tobias Dieterich, Friedrichshafen (DE); Sven Bieber, Markdorf (DE); Anton Arnold, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/644,828

(22) Filed: Apr. 24, 2024

(65) Prior Publication Data

US 2024/0360902 A1    Oct. 31, 2024

(30) Foreign Application Priority Data

Apr. 25, 2023    (DE) ............... 10 2023 203 785.8

(51) Int. Cl.

| | |
|---|---|
| *F16H 57/04* | (2010.01) |
| *F16H 47/06* | (2006.01) |
| *F16H 59/72* | (2006.01) |
| *F16H 61/00* | (2006.01) |
| *F16H 61/16* | (2006.01) |

(52) U.S. Cl.
CPC ............ *F16H 61/16* (2013.01); *F16H 47/06* (2013.01); *F16H 57/0413* (2013.01); *F16H 59/72* (2013.01); *F16H 61/0059* (2013.01)

(58) Field of Classification Search
CPC ...... F16H 61/16; F16H 47/06; F16H 57/0413; F16H 59/72; F16H 61/0059
See application file for complete search history.

(56) References Cited

U.S. PATENT DOCUMENTS

| | | | |
|---|---|---|---|
| 8,410,401 B2* | 4/2013 | Thomas | B60L 1/12 |
| | | | 219/205 |
| 8,858,393 B2* | 10/2014 | Nogle | B60W 10/115 |
| | | | 477/110 |
| 9,366,336 B2* | 6/2016 | Gooden | F16H 61/0006 |
| 11,994,207 B2* | 5/2024 | Fischer | F16H 61/0059 |
| 2020/0055520 A1 | 2/2020 | Glockner et al. | |
| 2023/0407960 A1 | 12/2023 | Fischer | |

FOREIGN PATENT DOCUMENTS

| | | | | |
|---|---|---|---|---|
| DE | 10 2015 200 682 A1 | | 7/2016 | |
| DE | 102020214635 A1 | * | 5/2022 | ......... F16H 57/0413 |
| DE | 10 2019 214 605 A1 | | 3/2023 | |

* cited by examiner

*Primary Examiner* — Justin Holmes
(74) *Attorney, Agent, or Firm* — Finch & Maloney PLLC

(57) ABSTRACT

The present invention relates to a method for heating a transmission (1) for a working machine having a plurality of hydraulically actuated shifting elements (8; 9; 10; 11; 12; 13). The method involves the sending (III) of a closing signal for closing shifting elements (8; 9; 10; 11; 12; 13) in order to block the transmission (1). In addition, the method entails pulsed actuation (V) for opening and closing of at least one of the closed shifting elements (8; 9; 10; 11; 12; 13) while the transmission (1) remains blocked. Furthermore, the present invention relates to a control unit which is designed to carry out such a method, and to a transmission for a working machine with such a control unit.

9 Claims, 3 Drawing Sheets

METHOD FOR HEATING A GEARBOX FOR A WORKING MACHINE

RELATED APPLICATIONS

This application claims the benefit of and right of priority under 35 U.S.C. § 119 to German Patent Application no. 10 2023 203 785.8, filed on 25 Apr. 2023, the contents of which are incorporated herein by reference in its entirety.

TECHNICAL FIELD

The preset invention relates to a method for heating a transmission for a working machine. The transmission comprises a plurality of hydraulically actuated shifting elements. In addition, the present invention relates to a control unit designed to carry out such a method, and to a transmission for a working machine with such a control unit.

BACKGROUND

Working machines often have powershiftable multi-step transmissions in combination with a hydrodynamic torque converter. These transmission systems are used in working machines even at low and extremely low temperatures. Such transmissions are often operated with oil, which at low temperatures can change its aggregate condition from liquid to solid. With this oil, at low temperatures a transmission can at first not be controlled reliably. Accordingly, before the working machine is operated the transmission has to be warmed up. DE 10 2019 218 114 A1 relates to a method for heating a transmission with a torque converter, which is blocked by actuating a parking brake.

SUMMARY

The present invention relates to a method for heating a transmission for a working machine. The transmission can be of any type, for example, a powershift transmission, a hydraulic-mechanical power-branched transmission, or some other transmission. The transmission can be driven by an internal combustion engine and, alternatively or in addition, an electric motor. The working machine can be a building or an agricultural machine, such as a wheel loader or a tractor. The transmission comprises a plurality of hydraulically actuated shifting elements. The shifting elements can be clutches, brakes, and, alternatively or in addition, other shifting elements. One, more than one, or all the shifting elements of the transmission can be in the form of frictional shifting elements such as disk clutches, or alternatively interlock-type shifting elements. The shifting elements of the transmission can be actuated hydraulically, i.e., opened and closed by means of a hydraulic fluid. The hydraulic fluid can be oil. The transmission can comprise a source of hydraulic fluid, for example a hydraulic sump, which can receive hydraulic fluid from or feed it to the shifting elements and, if necessary, other components of the transmission.

The method comprises the emitting of a closing signal for the closing of shifting elements of the transmission in order to block the transmission. In the context of the present invention at least two shifting elements are closed in order to block the transmission. Blocking of the transmission is understood to mean a condition in which there is no rotation speed difference in the power flow path between the drive input and the drive output of the transmission. Accordingly, in the blocked condition of the transmission, it is not possible to transmit a torque from the drive input to the drive output of the transmission. The transmission can be blocked, for example, if two different gear ratios between the drive input and the drive output are engaged at the same time, for example, by closing two clutches that correspond to the gear ratios.

In an embodiment, the transmission can comprise a driving direction change assembly for engaging a rotation direction of the drive output of the transmission, and a driving range assembly for engaging a rotation speed of the drive output of the transmission. The driving direction change assembly can, for example, comprise one or two clutches for switching from a forward rotation direction of the drive output with different gear ratios. In addition, the driving direction change assembly can comprise a further clutch for engaging a reverse rotation direction of the drive output of the transmission. The driving range assembly can, for example, comprise three clutches for engaging three different gear ratios, and thus three different rotation speeds of the drive output of the transmission. Embodiments with more or fewer clutches in the driving direction change assembly and/or the driving range assembly are also possible in the context of the present invention.

Furthermore, the method includes a pulsed actuation mode for opening and closing at least one of the closed shifting elements while the transmission remains blocked. A pulsed actuation mode of a shifting element is understood to mean that the shifting element is first opened and then closed again in pulses. A pulse can include both the opening and the closing processes. The shifting element can remain open for a certain time, for example, a certain pulse duration, before it is closed again. The pulse duration can be in the range of minutes, seconds, or milliseconds. The pulse shape can be essentially rectangular, parabolic, sinusoidal with a half-period duration, or some other shape. To open or close the shifting element hydraulic fluid is needed, which, for example, can be drawn from the above-mentioned hydraulic sump. In the context of the method the pulsed actuation takes place in such manner that even during the opening and closing of at least one of the shifting elements, the transmission still remains blocked.

Due to the pulsed control mode the cold hydraulic fluid is gradually expelled from valves, lines, and the shifting element itself, and replaced with warm hydraulic fluid from the hydraulic sump, which is heating up. This heats up all the mechanical and mechatronic systems of the transmission. At any time, the method ensures that the transmission is blocked and hence that the vehicle is at a standstill, without the need for any particular condition of a parking brake. The blocking of the transmission at any stage of the method also has the result that no shifting components are under load, since by virtue of the pulsed actuation process, there are no rotation speed differences at shifting elements of the transmission. Furthermore, the method has the advantage that no fluctuating noise is produced, since owing to the blocking of the transmission no masses are slowed down or accelerated. In that way the method shortens the time needed for a cold start to the minimum time required, and this enables the working machine to be used more efficiently.

In the context of an embodiment, the pulsed actuation mode involves actuating the shifting element with a plurality of pulse-shaped cycles for opening and closing the shifting element. As already mentioned, in this, a cycle can include a single opening and closing of the shifting element. With increasing number of cycles the pulse duration can decrease. In other words, at the beginning of the method the shifting element is left in the open condition for a longer time than at a later stage of the method. With increasing number of cycles the pulse duration can decrease linearly, exponentially, or in some other way. The pulse duration is limited by the follow-up behavior of the hydraulic control of the clutch. The clutch must remain open until the pressure too can fall. The clutch must remain closed before another is opened, until it is certain to be pressurized so that the blocking of the transmission is ensured. The hotter the transmission is, the faster the shifting element can be pulsed since, with increasing number of cycles, the hydraulic fluid becomes hotter and can follow the target specification of the pressure control more closely. For that reason, the pulse duration and the interval between pulses can be longer at the beginning and become progressively shorter as the number of cycles, and therefore the transmission temperature increase. Thus, with this embodiment, a particularly quick cold start is made possible.

In an embodiment, the method includes the determination of a temperature, for example, a transmission temperature, which can be measured in a section of the transmission. In an alternative embodiment, a temperature of the surroundings can also be detected. The temperature can be determined at the beginning of the method, for example, when a drive unit of the working machine by which the transmission can be driven is still at rest or has just been switched on. In other words, the temperature can be detected at a point in time when the transmission has not yet been warmed up and, for example, is still essentially at the temperature of its surroundings. In another embodiment, the method can include the determination of a cycle number for opening and closing the shifting element as a function of the temperature measured. In this case, the cycle number can determine how often the shifting element should be opened and closed again. The lower the temperature measured, the larger can be the cycle number. For example, as the temperature falls the cycle number can increase linearly, exponentially, or in some other way. In this embodiment, it can also be checked whether the temperature determined is lower than a limit value. For example, if the measured temperature is lower than the limit value, it can be confirmed that the transmission has to be heated, but if the measured temperature is higher than the limit value, it can be confirmed that the transmission does not need to be heated. Only in the case when heating the transmission is necessary, is it necessary to determine the above-discussed cycle number in the following step. In that case, the cycle number can be determined such that after the end of the pulsed actuation of the shifting element with the cycle number determined, the transmission is hot enough to be operated.

This event-based cold-starting strategy has the advantage that the end of the heating process does not depend on a temperature measurement in the transmission. The latter has the problem that such a temperature measurement often cannot detect temperature gradients that still exist in the transmission, and therefore, no statement can be made about the warm-up that has already occurred for the entire transmission. Some areas, for example, close to the main oil stream of the transmission oil pump, will soon reach a high temperature while other parts of the transmission are still very cold. By virtue of the cycle-based heating strategy, in accordance with this embodiment, in contrast, it can be ensured that at the end of the heating process the whole of the transmission will be at a temperature suitable for operation.

In another embodiment, the method includes checking that a power transmission request exists for the transmission. Such a power transmission request, for example, can be a starting command issued by a driver. In the context of an embodiment, the checking for a power transmission request can be carried out when the transmission has been heated sufficiently, i.e., when the above-described cycle number for opening and closing the shifting element has been completed. If no power transmission request is recognized in the checking step, the pulsed actuation of the shifting element can be continued, for example, even if the transmission is already hot enough to be operated. In that way, the transmission can be heated even more in order to be brought to an even better starting condition and availability. As soon as a power transmission request is recognized, the method for heating the transmission can be discontinued. The power transmission request is recognized, for example, when a parking brake is opened and, alternatively or in addition, a gear is engaged.

In an embodiment, the emitting of a closing signal includes the output of a closing signal to all the driving direction clutches for engaging a rotation direction of a transmission drive output and the output of a closing signal to all the driving range clutches for engaging a rotation speed of the transmission drive output of the transmission. A closing signal can be sent to all the clutches of the transmission. For example, closing signals can be sent to all the clutches of the above-described driving direction change assembly and all the clutches of the above-described driving range assembly. This ensures reliable blocking of the transmission, since all the clutches of the transmission are closed. In an alternative embodiment, closing signals can be sent to only some of the shifting elements of the transmission, for example, some of the above-described clutches of the driving direction change assembly or the driving range assembly. Thus, in an embodiment, closing signals can be sent only to all the clutches of driving direction change assembly or, alternatively, only to all the clutches of the driving range assembly. In contrast, in the embodiments, the closing signals are sent in such manner that the transmission is blocked by the shifting elements and still remains blocked even during the pulsed actuation of at least one of the shifting elements.

The pulsed actuation can comprise an alternating pulsed actuation always of only one of the shifting elements of the transmission. For example, in alternation, one shifting element of the driving direction change assembly and then one shifting element of the driving range assembly can be actuated before, after that, one shifting element of the driving direction change assembly is again pulse-actuated, and so on. This enables a uniform heating of the transmission since all the shifting elements are actuated in pulses. At the same time, a more reliable blocked condition of the transmission can be ensured since only one shifting element at a time is opened. In an alternative embodiment, more than one shifting element can be pulse-actuated at the same time, provided that it is ensured that the transmission nevertheless remains blocked.

In an embodiment, the transmission comprises a hydrodynamic torque converter, which can have a pump wheel and a turbine wheel. The pump wheel can be functionally connected to a drive mechanism of the working machine, for example, an internal combustion engine and, alternatively or in addition, an electric motor. The turbine wheel can be mechanically functionally connected with one or more shifting elements of the transmission. By blocking the transmission, the turbine wheel of the torque converter can also be blocked. The torque converter can be operated by means of a hydraulic fluid, which can be drawn and delivered from a hydraulic fluid source such as a hydraulic sump. The hydraulic fluid source can be the same one that supplies the shifting elements of the transmission with hydraulic fluid.

In this embodiment, the method can include the control of a drive input mechanism, which is mechanically functionally connected to the torque converter. When the drive input mechanism accelerates, the pump wheel of the torque converter mechanically functionally connected with it also accelerates, while the turbine wheel can remain blocked by virtue of the blocked transmission. In that way, within the torque converter hydrodynamic friction takes place which heats up the hydraulic fluid. In this embodiment, the hydraulic fluid can be drawn from the hydraulic source and circulated through the torque converter, which results in heating of the hydraulic fluid by the hydrodynamic friction taking place in the torque converter. This enables rapid heating of the transmission. Thus, this embodiment makes use of the synergy that the hydraulic fluid, which is used to actuate the shifting element, is also heated by the torque converter.

In an embodiment, the method further includes checking whether the transmission is inactive and/or whether a calibration of one of the shifting elements of the transmission should be carried out. In this embodiment, only when one of these conditions is present is the method for heating the transmission carried out. In that way, it can be ensured that the method is only carried out in situations when heating of the transmission is necessary.

The present invention also relates to a control unit, which is designed, i.e., specifically prepared, for example, programmed, to carry out a method according to any of the above-described embodiments. The control unit can comprise a storage device, for example, a non-volatile memory, in which a program for carrying out the aforesaid method can be stored. Furthermore, the control unit can have one or more interfaces, which can be designed, i.e., specifically programmed to interact with the above-described components for carrying out the method in the described manner. The control unit can comprise one or more components, which can be located in it or at various other locations, such that the components can communicate with one another via a network such as the internet.

Furthermore, the present invention relates to a transmission for a working machine having a plurality of hydraulically actuated shifting elements and a control unit for actuating the shifting elements in accordance with the above-described embodiments. As regards the form and advantages of the individual features, reference should be made to the above explanations in connection with the method for heating the transmission.

DETAILED DESCRIPTION OF EMBODIMENTS

Figure 1:
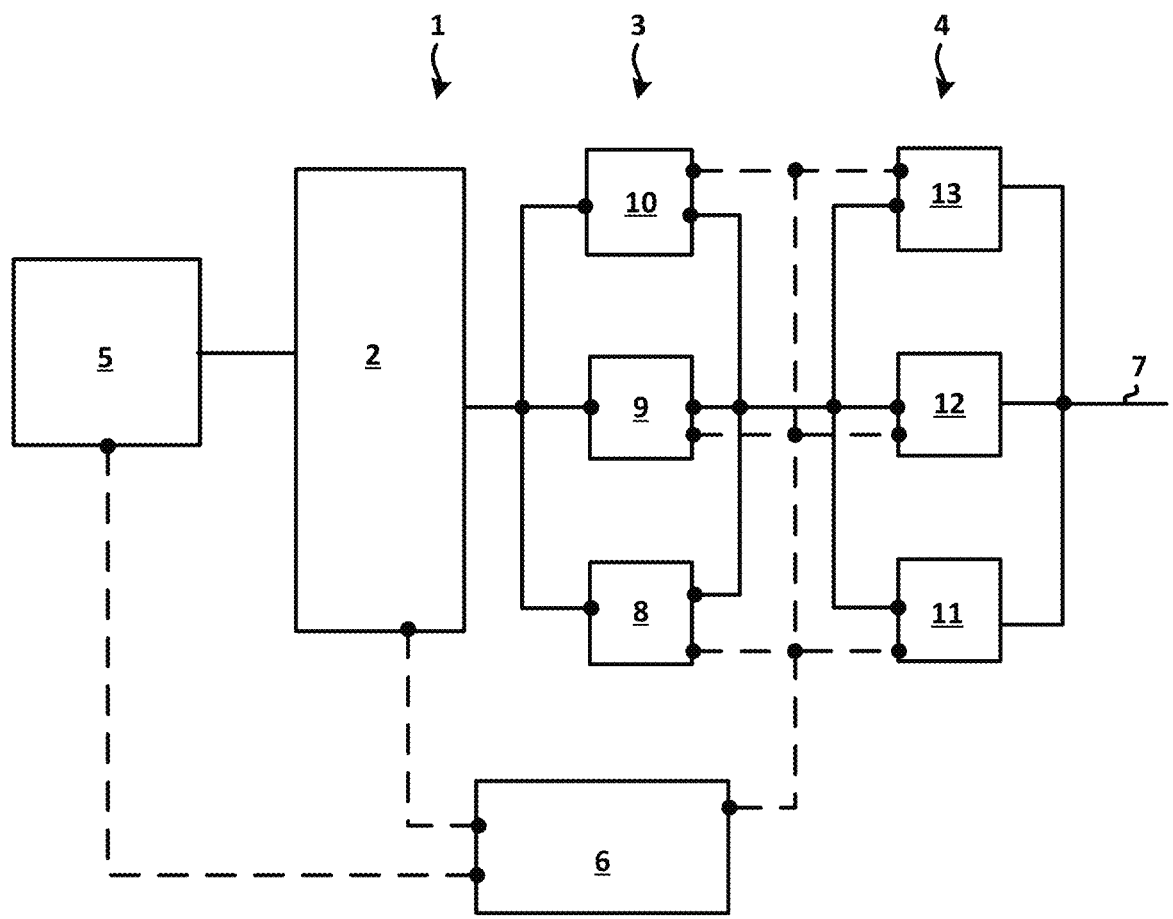
FIG. 1 shows schematically a transmission for a working machine according to an embodiment of the present invention.

FIG. 1 shows schematically a transmission 1 for a working machine according to an embodiment of the present invention. The transmission 1 comprises a hydrodynamic torque converter 2, a driving direction change assembly 3, and a driving range assembly 4. In addition, the transmission 1 comprises a drive input mechanism 5 and a control unit 6. The drive input mechanism 5, in this embodiment, is in the form of an internal combustion engine. In an alternative embodiment, the drive input mechanism 5 is in the form of an electric motor. The drive input mechanism 5 is mechanically functionally connected to the torque converter 2, which, in this embodiment, is in the form of a Föttinger converter. The converter 2 comprises a pump wheel, which is mechanically functionally connected with the drive input mechanism 5. A turbine wheel is mechanically functionally connected to the pump wheel, which, in the present embodiment, is mechanically functionally connected to the driving direction change assembly 3.

The driving direction change assembly 3 is designed to engage a rotation direction of the transmission output 7. For that purpose, the driving direction change assembly 3 comprises shifting elements, each in the form of a clutch. A first clutch 8 serves to engage a forward driving direction with a first gear ratio. A second clutch 9 also serves to engage a forward driving direction, but with a gear ratio different from that produced by the clutch 8. A third clutch 10 serves to engage a reverse driving direction. The driving direction change assembly 3 is mechanically functionally connected to the driving range assembly 4. By means of the driving range assembly 4, different rotation speeds can be produced at the drive output 7 of the transmission 1. For this, the driving range assembly 4 has a first clutch 11, a second clutch 12, and a third clutch 13, each of which can engage different gear ratios and hence different rotation speeds at the drive output 7. Thus, by means of the transmission 1 of this embodiment, by virtue of the three driving range clutches 11, 12, 13, a total of six driving ranges in the forward direction, namely one via the forward clutch 8 or, alternatively, via the forward clutch 9, and three driving ranges in the reverse direction, namely via the reversing clutch 10, can be engaged.

In the present embodiment, all the clutches 8, 9, 10, 11, 12, and 13 of the transmission 1 are in the form of frictional disk clutches. All the clutches 8, 9, 10, 11, 12, and 13 can be actuated hydraulically, in this embodiment, by means of oil. For the hydraulic actuation of the clutches 8, 9, 10, 11, 12, and 13 a hydraulic sump (not shown) is provided, from which hydraulic fluid is drawn and delivered to the clutches 8, 9, 10, 11, 12, and 13 for their operation. The hydrodynamic torque converter 2 too is connected to the hydraulic sump in order to draw hydraulic fluid from and return it to the sump as required for its operation.

Figure 2:
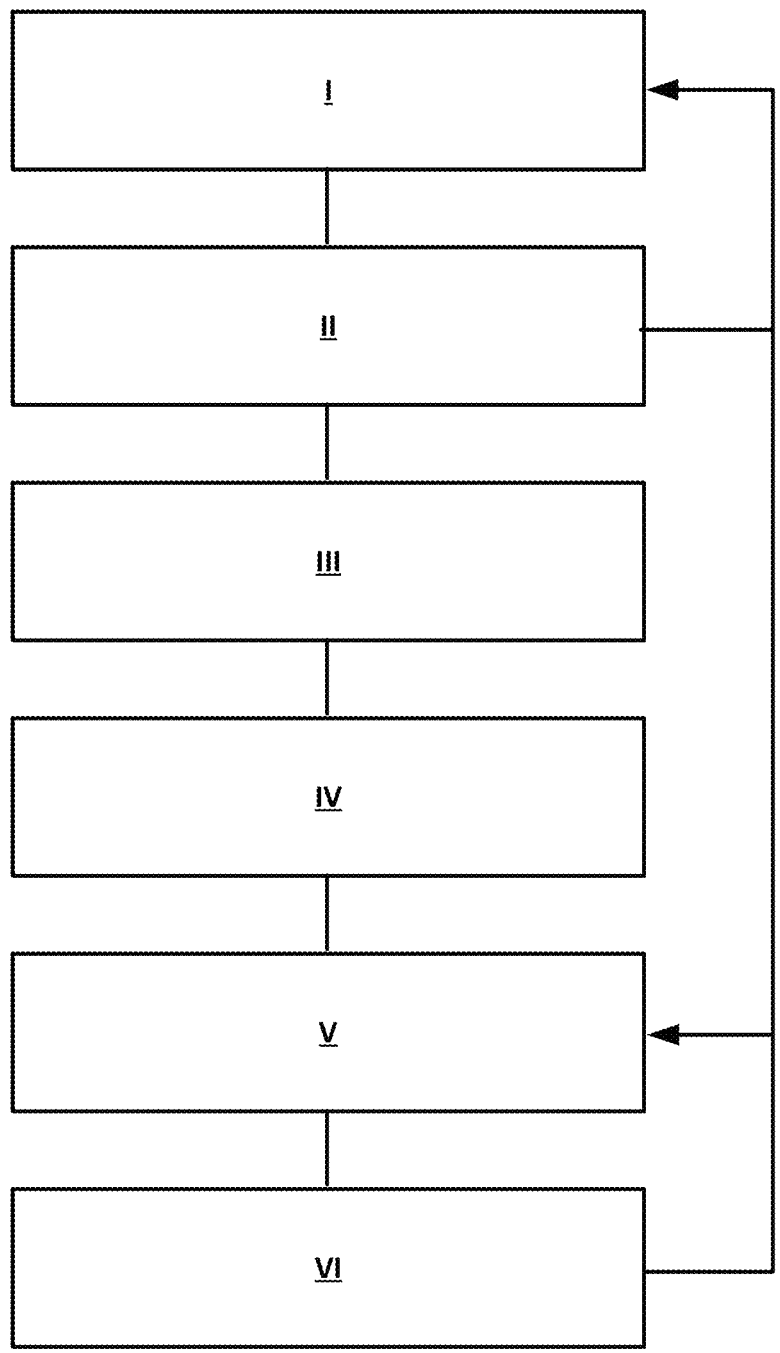
FIG. 2 shows schematically a flow chart of a method for heating the transmission of FIG. 1, according to an embodiment of the present invention.

In addition, the transmission 1 comprises the control unit 6, which is connected electronically to the clutches 8, 9, and 10 of the driving direction change assembly 3 and to the clutches 11, 12, and 13 of the driving range assembly 4. Likewise, the torque converter 2 and the drive input mechanism 5 are also connected electronically to the control unit 6. By means of the control unit 6 the clutches 8, 9, 10, 11, 12, and 13, the torque converter 2, and the drive input mechanism 5 can be actuated and controlled. The control unit 6 is designed to carry out the method for heating the transmission 1 described below with reference to FIGS. 2 and 3.

In a first step I, the control unit 6 determines whether the method for heating the transmission 1 should be carried out. For that, in the present embodiment, it is checked whether the working machine is at a standstill. If so, then, in this embodiment, the method is carried out. Furthermore, in step I, the control unit 6 checks whether any of the clutches 8, 9, 10, 11, 12, and 13 should be calibrated. In that case too, in the context of the present invention, the method is carried out. If, in step I, it is determined that the method for heating the transmission 1 should indeed be carried out, the process advances to step II.

In step II, a starting temperature is now determined. In this embodiment, in step II, the control unit 6 determines, by means of a temperature sensor (not shown), the starting temperature in the transmission 1. Depending on the starting temperature determined, in step II, a number of opening and closing cycles of the shifting elements 8, 9, 10, 11, 12, and 13 is established. The lower the starting temperature, the larger is the number of cycles for opening and closing the shifting elements. If the starting temperature is above a limit value, i.e., if at the beginning of the method the transmission 1 is warmer than a certain limit value, it is established that the transmission does not need to be heated. In that case, the method does not carry out any heating of the transmission. On the other hand, if, in step II, it is found that the starting temperature is lower than the limit value, the opening and closing cycle number of the shifting elements is determined. In this embodiment, the temperature is determined by a temperature sensor provided in the transmission 1. The process then advances to step III.

In step III, in this embodiment, the control unit 6 sends out a closing signal to all the clutches in the transmission, i.e., to the driving direction change clutches 8, 9, and 10 and to the driving range clutches 11, 12, and 13. In this embodiment, the driving range clutches 11, 12, and 13 are closed first, since, in these, there is no rotation speed difference and therefore no load on the clutches. Thereafter, the driving direction change clutches 8, 9, and 10 are closed. In this, it is important that the closing clutch elements should not slip for too long since that could result in thermal overloading. Accordingly, in this case, the primary rotation speed at the clutch must be monitored. If this is not brought down to zero in an acceptable time, the closing attempt is interrupted and, after a certain waiting time, a further closure is attempted. In this embodiment, the driving range change clutches 8, 9, and 10 are closed at the same time so that there is a power branching between clutches being controlled. By closing the clutches 8, 9, and 10, the turbine of the hydrodynamic converter 2 is brought to a standstill and blocked. If now all the clutches 8, 9, 10, 11, 12, and 13 of the transmission are locked, there are no longer any rotation speed differences in the transmission 1. The transmission 1 is blocked.

Since the pump wheel of the torque converter 2 is driven by the drive input mechanism 5, in a subsequent step IV, the control unit 6 initiates a pumping of oil from the hydraulic sump through the torque converter 2. Owing to the rotation speed difference between the pump wheel and the turbine wheel in the converter 2, the temperature of the oil flowing through the converter 2 is increased due to hydrodynamic friction. Thereby, the oil in the hydraulic sump used to actuate the shifting elements 8, 9, 10, 11, 12, and 13 is also heated.

Figure 3:
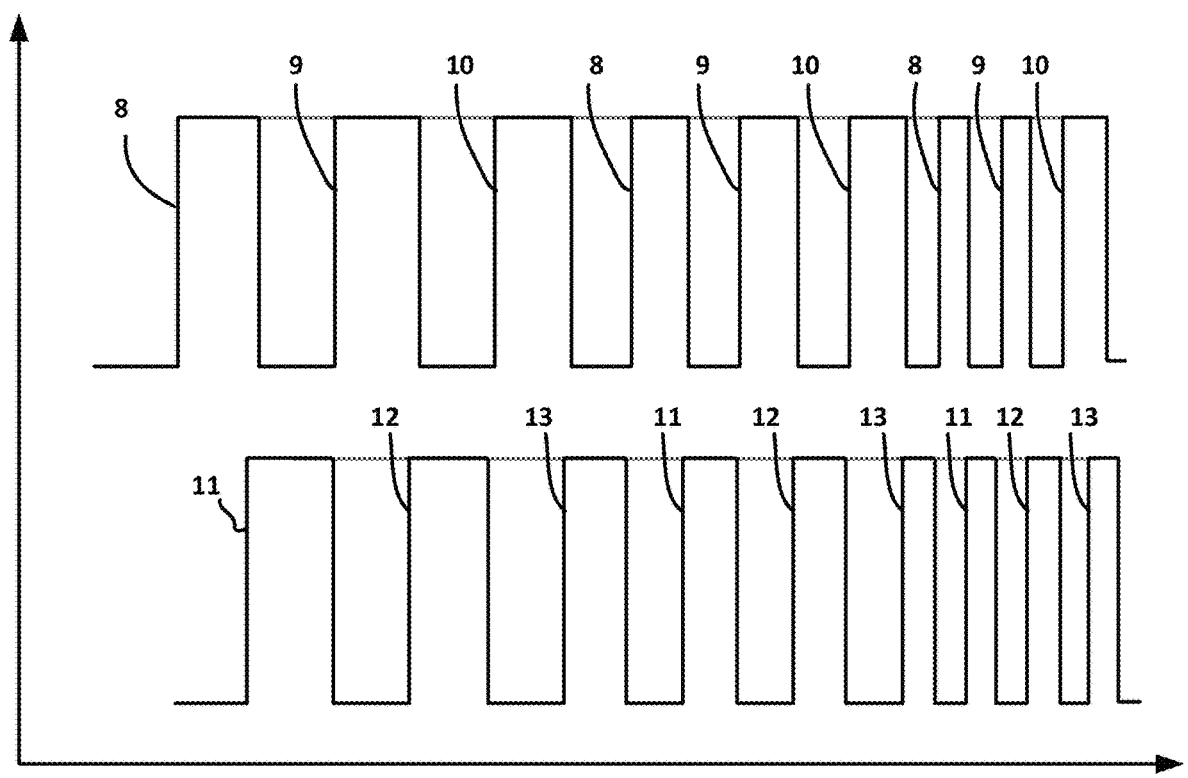
FIG. 3 shows schematically signals for the pulsed actuation of the shifting elements in the transmission of FIG. 1.

In the next step V, the clutches 8, 9, 10, 11, 12, and 13 of the transmission 1 are now actuated in alternation in pulses by the control unit 6 in order to open and close them. During this, always only a single clutch at a time is opened by the control unit 6. Thus, in step V, in this embodiment, in alternation one clutch 8, 9, 10 of the driving direction change assembly 3 and then one clutch 11, 12, 13 of the driving range assembly is actuated. In FIG. 3, the actuation pulses for opening and closing the clutches 8, 9, 10 of the driving direction change assembly 3 are shown at the top and the actuation pulses for opening and closing the driving range clutches 11, 12, 13 of the driving range assembly 4 are shown at the bottom.

As shown in FIG. 3, the clutch 8 of the driving direction change assembly 3 is first actuated in a pulse in order to be opened and then closed. The opening pulse is denoted in FIG. 3 with the index 8. Then, the control unit 6 actuates the clutch 11 of the driving range assembly 4 to open and close it. The pulse for opening the cutch 11 is denoted in FIG. 3 by the index 11. Following the pulsed actuation of the clutch 11, in the next step, the clutch 9 of the driving direction change assembly 3 is pulse-actuated, as indicated by the index 9 in FIG. 3. After that, the clutch 12 of the driving range assembly 4 is pulse-actuated to open and close it. Thereafter, the clutch 10 of the driving direction change assembly 3 is pulse-actuated, before the control unit 6 actuates the clutch 13 of the driving range assembly 4. Now, a first cycle of the pulsed actuation of all the clutches 8, 9, 10, 11, 12, and 13 of the transmission 1 has been completed. In this embodiment, a second and a third cycle of actuating all the clutches are carried out by the control unit 6 in a corresponding manner, as shown in FIG. 3. In this embodiment, the pulse duration, for example, the time during which each clutch is opened, is equal for all the clutches within a cycle. As shown in FIG. 3, however, the pulse duration for all the clutches decreases as the cycle number increases. This means that the pulse duration for the second cycle is shorter than the pulse duration for the first cycle. In turn, the pulse duration for the third cycle is shorter than the pulse duration for the second cycle.

In this embodiment, once the number of cycles of pulsed opening and closing of the clutches 8, 9, 10, 11, 12, and 13 of the transmission 1, established in step II, has been completed, in step VI, the control unit 6 checks whether the driver of the working machine has issued a command to start up the vehicle. If no such command, i.e., a request for power transmission through the transmission 1, is recognized, the method returns to step V and continues the pulsed actuation of the clutches 8, 9, 10, 11, 12, and 13 in the manner described. Otherwise, the method returns to step I.

INDEXES

1 Transmission
2 Hydrodynamic converter
3 Driving direction change assembly
4 Driving range assembly
5 Drive mechanism
6 Control unit
7 Drive output
8, 9, 10 Driving direction change clutch
11, 12, 13 Driving range clutch
I Check whether transmission heating is necessary
II Detection of temperature and determination of number of cycles
III Blocking of the transmission
IV Actuation of torque converter
V Pulsed actuation of shifting elements
VI Checking for a power transmission request

The invention claimed is:
1. A method for heating a transmission for a working machine having a plurality of hydraulically actuated shifting elements, the method comprising:
sending a closing signal for closing shifting elements of the transmission in order to block the transmission; and pulsed actuation to open and close at least one of the closed shifting elements while the transmission remains blocked;

wherein the pulsed actuation consists in actuating, with a number of pulsed cycles for opening and closing, at least one of the plurality of hydraulically actuated shifting elements, wherein a pulse duration of the actuation decreases as a number of cycles increases.

2. The method according to claim 1, further comprising:

detecting a temperature; and determining a number of cycles for opening and closing the at least one of the plurality of hydraulically actuated shifting elements as a function of the temperature detected.

3. The method according to claim 1, comprising:

checking for a power transmission request through the transmission;

recognizing no power transmission request; and continuing the pulsed actuation of the at least one of the plurality of hydraulically actuated shifting elements.

4. The method according to claim 1, wherein the at least one of the plurality of hydraulically actuated shifting elements include driving direction clutches and sending the closing signal involves sending the closing signal to all the driving direction clutches to engage a rotation direction of a transmission drive output of the transmission, and sending the closing signal to all the driving range clutches to engage a rotation speed of the transmission drive output of the transmission.

5. The method according to claim 4, wherein the pulsed actuation is carried out by the pulsed actuation of only one the plurality of hydraulically actuated shifting element of the transmission.

6. The method according to claim 1, wherein the transmission comprises a hydrodynamic torque converter which, together with the plurality of hydraulically actuated shifting elements, is configured to be supplied with hydraulic fluid from a hydraulic source, and wherein the method comprises an actuation for accelerating a drive mechanism which is mechanically functionally connected to the torque converter in order to heat the hydraulic fluid.

7. The method according to claim 1, comprising checking whether the transmission is at a standstill and/or checking whether a calibration of one of the shifting elements should be carried out.

8. A control unit configured to carry out the method according to claim 1.

9. A transmission for a working machine having a plurality of hydraulically actuated shifting elements and the control unit according to claim 8 for actuating the plurality of hydraulically actuated shifting elements.

* * * * *